Nov. 9, 1965   R. R. THOMPSON   3,216,734
ADAPTER
Filed July 9, 1962   2 Sheets-Sheet 1

INVENTOR
Robert R. Thompson
BY Milford A. Juten
ATTORNEY

Nov. 9, 1965   R. R. THOMPSON   3,216,734
ADAPTER
Filed July 9, 1962   2 Sheets-Sheet 2
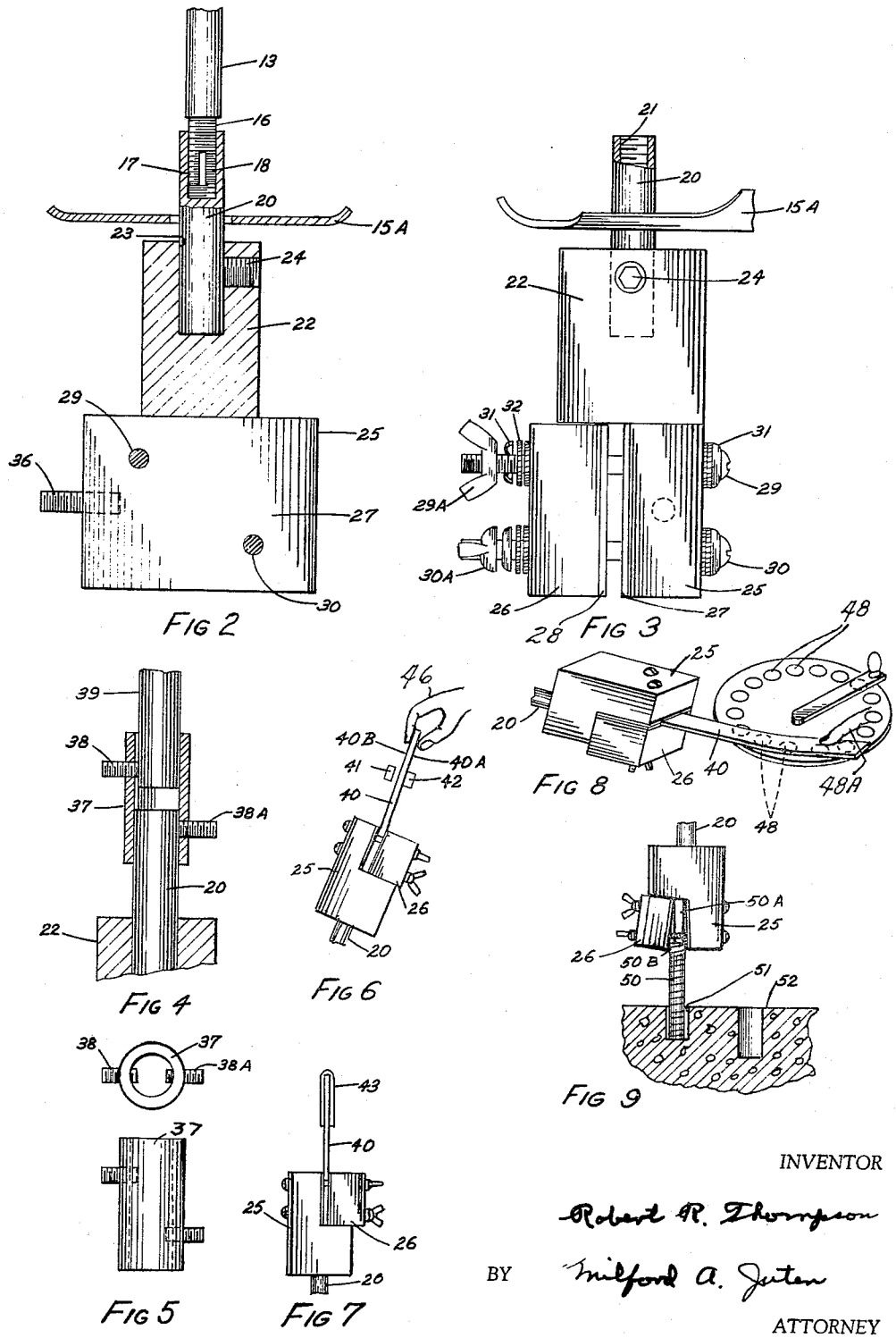
INVENTOR
Robert R. Thompson
BY Milford A. Juten
ATTORNEY

United States Patent Office 3,216,734
Patented Nov. 9, 1965

3,216,734
ADAPTER
Robert R. Thompson, Brookmont, Md.
(6031 Ridge Drive, Washington 16, D.C.)
Filed July 9, 1962, Ser. No. 208,419
8 Claims. (Cl. 279—44)

This application relates to a tool holder for application to an existing power operated reciprocation motion producing machine so that many different types of work can be performed with different tools without requiring a different machine or a different tool holder so that a workman with a minimum of equipment will be able to take advantage of power to increase the output of useful work.

Heretofore it has been customary to maintain electrical contacts by manually abrading the contacts with sand paper or files which required much valuable time of skilled personnel. In other types of work it has usually been necessary to have a different power machine for each type of work being performed thus increasing the cost of equipment and/or the inconvenience and expense of getting a different worker with the proper tool for each type of work with resulting high cost of various types of work accomplished.

An object of the present invention is to overcome these disadvantages of prior art methods and equipment and to provide for maintaining electrical contacts in satisfactory operating condition by power means, which power means will be useful for other purposes.

A further object is to provide an adapter for application to an existing reciprocating motion producing machine and which will support practically any tool without modification of the tool or the adapter.

Briefly the present invention includes equipment including an adapter for mounting on a reciprocating shaft of a well known type of reciprocation producing machine sold as a saber saw and the adapter comprises a body providing means to mount the body on the reciprocating shaft of the saber saw and includes a first jaw fixed to the body and a second jaw adjustably mounted on the first jaw by two clamping screws positioned on opposite sides of the prolongation of the axis of the reciprocating shaft and offset along the axis to provide for gripping tools having parallel shank portions or non-parallel shank portions and the body provides an abutment shoulder for the shank of the tool to positively reciprocate the tool held in the adapter assuring positive action of the tool with respect to the adapter and assuring positive motion of the tool. The clamping face of each jaw is provided with a resilient layer which retains the clamping screws and accommodates for irregularities in the shank of the tool and prevents damage to the tools.

Other and further objects will be apparent as the description proceeds and upon reference to the accompanying drawings wherein:

FIG. 2 is a fragmentary section on an enlarged and substantially full scale taken substantially on line 2—2 of FIG. 1 showing the angularly adjustable stub shaft of the adapter mounting passing through the tool receiving slot in the work engaging foot of the saber saw and showing the clamping face of the first jaw in elevation.

FIG. 3 is a side elevation of the tool holder adapter with the stub shaft passing through the slot in the work engaging guide foot of the saber saw and with the jaws out of clamping relation while illustrating the structure and the cooperative association of parts.

FIG. 4 is a section showing supplemental coupling in attaching relation for attachment of the adapter or tool holder to a shaft of a different type reciprocation producing motor.

FIG. 5 is an end view of the supplemental coupling shown in FIG. 4, and a side elevation.

FIG. 6 is a side elevation of the sanding strip abrading electrical contacts while supported in the attachment with the free end of the strip being guided by the fingers of one hand.

FIG. 7 is a similar view of a sanding strip with a piece of sandpaper folded over the free end and being held in operative position by the hand so that any grade of sandpaper may be used or any sandpaper strip mounted in the attachment avoiding insertion of separate strips for each sanding.

FIG. 8 is a similar view of sandpaper strip simultaneously sanding several contacts of a speed control to even height.

FIG. 9 shows a masonry drill supported in the attachment in a partially drilled hole in a cinder block beside a previously drilled hole illustrating how the tool of irregular shaped shank will be held in the adapter and how two holes can be made closely adjacent each other without breaking the wall therebetween.

Figures 1, 10:
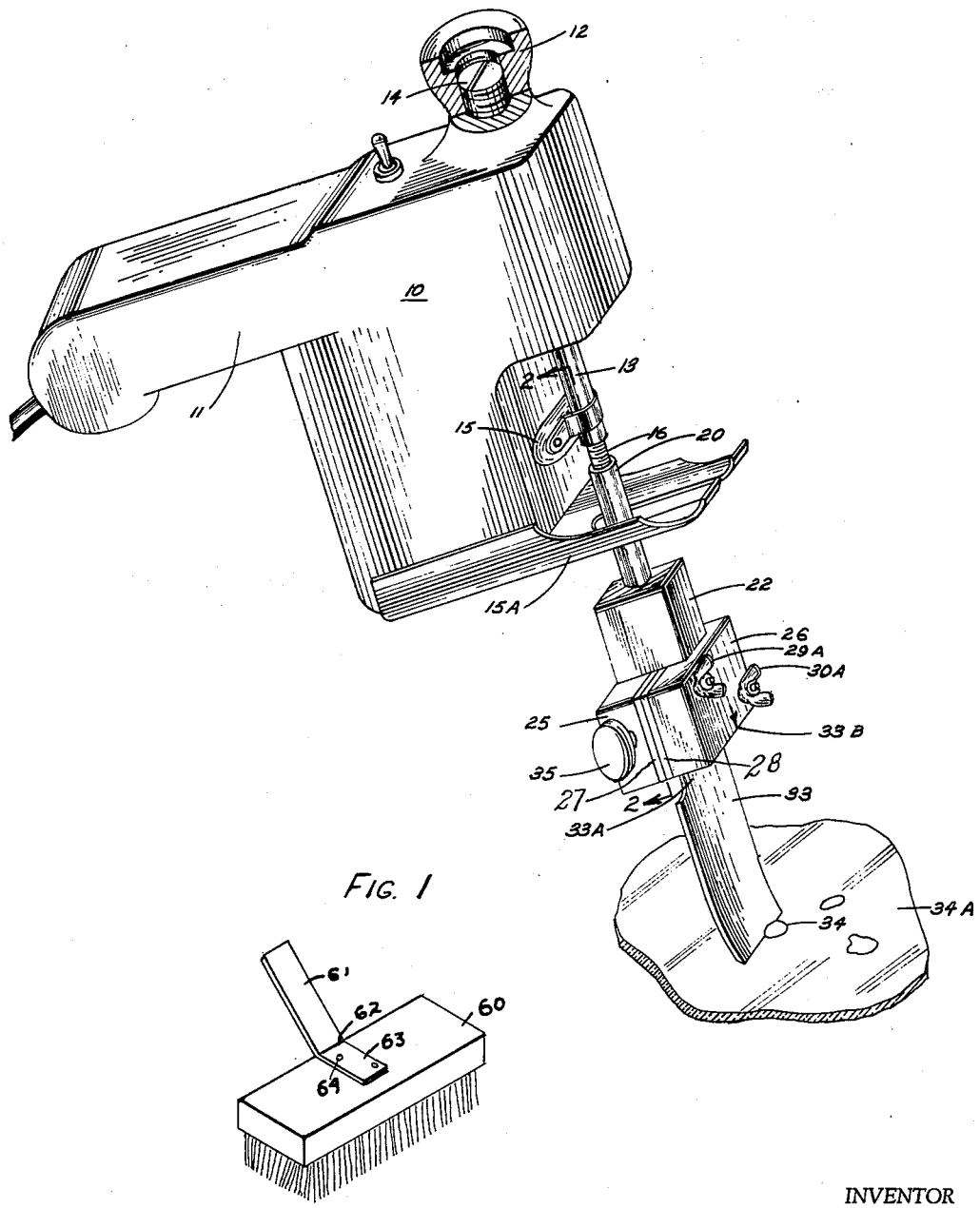
FIG. 1 is a perspective of a Weller saber saw motor operated directly from electrical coil means causing longitudinal reciprocation of a shaft and showing the tool adapter of the present invention mounted thereon and holding a putty knife in operative position removing paint from a glass surface.
FIG. 10 is a perspective of a brush having a shank at an angle for securement in the clamping jaw means of the present invention to perform a brushing and cleaning action.

Upon more detailed reference to the drawings a commercially available saber saw manufactured under the trade name of Weller is shown in FIG. 1 and includes a case 10 providing a handle 11 for one hand and a knob handle 12 for the other hand so that the saber saw can be accurately controlled. The shaft 13 is reciprocated by means of an electromagnetic coil within the case the displacement of which is controlled by an adjusting screw 14 within the knob handle 12 so that the reciprocation of shaft can be accurately controlled as the shaft is guided by the rubber-like mountings 15.

Normally a saw blade is supported in the lower threaded and slitted end of the shaft 13 with the shank end of the blade in the slit and a threaded nut surrounding the end 16 and shank of the saw blade causing portions 17 and 18 on opposite sides of the saw receiving slit to be forced together clamping the saw blade securely to the shaft 13.

The adapter of the present invention comprises a stub shaft 20 having a threaded bore 21 at one end receiving the threaded end 16 of the shaft 13. A body 22, provided with a bore 23, is mounted on the other end of the stub shaft 20 and is retained in fixed angular adjusted position by means of an Allen head set screw 24 in a threaded bore in the body 22 intersecting the bore 23.

A first vise jaw 25 is fixed to the other end of the body 22 projecting outwardly from each side and from the other end of the body 22.

A second and relatively movable clamping jaw is positioned in facing relation to said first jaw 25 and both jaws are provided with a pair of aligned bores located in diagonally opposite portions of said jaws on opposite sides of the axis of the stub shaft. Resilient layers of rubber like material 27 and 28 are secured to the clamping face of the jaws 25 and 26 respectively, with the resilient layers having smaller openings than the bores of the jaws in alignment with the bores of the jaws. Clamping screws 29 and 30 are mounted in the bores of the clamping jaws and are retained by the resilient gripping of the resilient layers 27 and 28 preventing rotation of the clamping screws 29 and 30 and retaining the jaws in position during the mounting of a tool.

A concave-convex washer 31 is positioned on each end of each clamping screw with the concave side of the washer toward the cooperating jaw. Pairs of lock washers 32 having sharp engaging edges are positioned between each concave-convex washer and the cooperating jaw securely maintaining screws of the jaws in adjusted condition when the screws are tightened by the cooperating wing nuts 29A and 30A, the clamping reaction being taken by the wing nuts at one end and the shoulders of the heads of the screws at the other end.

An index mark 33B is provided centrally of the movable jaw 26 so that the user can accurately position the tool in alignment with the shaft 13.

In FIG. 1 a putty knife with its handle removed is positioned with the shank 33A centrally between the jaws 25 and 26 and with the end of the shank 33A in abutting relation to the said other or lower end of the body 22 thereby assuring that the force of the reciprocating rod shaft 13 of the motor is positively transferred to the putty knife shank 33A in a pushing direction and thereby to the putty knife blade and the work being operated upon as shown in FIG. 1. Paint spots 34 are being removed from a surface such as a portion of a window pane. The putty knife blade is slightly curved or bent as occurs in its normal use but the reciprocating motion of the shaft 13 is still transferred to the sharp blade end of the putty knife so that the work is being done by the motor and the operator merely guides the putty knife by either or both handles 11 and 12 or by one of said handles 11 or 12 and a knob handle 35 mounted on the jaw 25 fixed to the body 22. A wider blade scraper mounted in the jaws is used for removing wall paper from a wall surface.

The handle 35 is supported by stud 36 threaded into the jaw 25 and the knob handle 35 is provided with a threaded bore receiving the outer end of stud 36 for removably securing the handle 35 in position. The action of the putty knife is improved by the use of a limited amount of paint remover and a very fine abrasive so that, with a minimum of labor, paint is removed by the power reciprocation of the shaft 13.

The motor has the usual adjustment 14 for this type of motor which controls the length of the stroke and such adjustment permits the use of the most advantageous length of stroke to obtain the maximum advantage of the equipment. Variations in the delicacy of the work being operated upon and upon the weight of the tool such a putty knife 33 or other tool affect the operation and it is important that the proper adjustment be made to obtain the maximum advantage of the present invention.

Upon reference to FIGS. 4 and 5 a supplemental coupling 37 of tubular configuration is shown with two Allen head set screws 38 threaded through radially extending threaded bores adjacent opposite ends of the coupling with set screw 38 engaging a reciprocating shaft 39 of a motor corresponding to shaft 13 but which is not provided with threads thereby securing the coupling 37 to shaft 39. The set screw 38A retains the stub shaft 20 in operative fixed relation to the coupling. The supplemental coupling provides means to secure the adapter of the present invention to the reciprocating shaft of any motor which produces the correct type of motion for use with the present invention thereby making the adapter usable with many different makes of motors. The bore in the supplemental coupling is of a size at one end to fit the reciprocating shaft of the motor and the bore at the other end is of a size to fit the stub shaft 20 of the adapter and such bores may be of the same or different diameters. It will be evident that the work engaging foot 15A of the motor has a slot of a size to freely receive either stub shaft 20 or adapter 37 or the slot is increased to a sufficient size to permit the mounting of the stub shaft or coupling for free movement.

The action of the equipment including the sanding strip 40 is a far more effective action of polishing electrical contacts than can be obtained by hand or other means and since the stroke of the sanding strip can be accurately controlled the polishing or sanding action can be made to be practically a burnishing action which assures that the resulting contact is restored to the best possible condition. The bending of the sandpaper strip as shown also provides an adjustment or variable which makes for effective polishing. It will be apparent that the sandpaper strip of the present invention can be inserted into positions where it is very difficult to manually manipulate a sandpaper strip and by the guiding of the sandpaper strip with the one hand it is possible to obtain accurately sanded contacts which could not be heretofore obtained.

In speed controls in which a radial contact arm moves over a number of contacts 48 arranged in a circular arrangement it is possible with the present equipment to sand several contacts 48 simultaneously along the periphery of the circular arrangement of contacts so that all contacts will be sanded to substantially the same height as shown in FIG. 8. In adjacent electrical contacts along a speed control this is particularly necessary to be sure of effective simultaneous contact of the movable radial contact with two adjacent contacts so that the speed control will operate smoothly according to the design thereof. In normal use the contacts wear on one edge more than on the other edge and consequently it is essential to restore the contacts to their original operating condition for satisfactory speed control operation. This advantageous operation can be used to bring several adjacent elements of other structure to a smooth relatively planar condition. The contacts of electrical panels can be restored without removal from the panel and in a fraction of the time previously required and the restoration of the contacts with the present equipment is more permanent so that less frequent service is required.

As shown in FIG. 8 the contacts 48 will be engaged by the sanding strip 40 but the sanding strip will tend to bend up and therefore produce the sanding action principally on a single contact and therefore the electrician using the invention arranges to place one or more fingers 48A in contact with the sanding strip 40 to press the sanding strip against the contacts 48 to produce the proper degree of sanding of each contact or several contacts simultaneously to assure the correct reconditioning of all of the contacts. The sanding strips 40 are of insulating material so that contacts can be reconditioned even without breaking the circuit.

A safety feature of the invention includes having the stub shaft 20 of a length so that the body 22 is closely adjacent the work engaging foot 15A preventing the user from getting his fingers between the body 22 and foot 15A so there is no danger of pinching the fingers in the use of the equipment of the invention.

The clamping jaws will accommodate any tool regardless of the shape of the shank. The tool shank may have the sides parallel as in the putty knife 33 or tapered or stepped as shown in the masonry drill 50 shown in FIG. 9. The tool engaging faces of clamping jaw 25 and movable jaw 26 accommodate for the stepped relation of the reduced shank 50A of the tool of which the upper end is appreciably smaller in diameter than the work engaging drill portion 50B so that the movable jaw 26 must assume an angle with respect to the first jaw 25 thereby engaging the end of the shank 50A and the upper end of the work engaging drill portion 50B with sufficient force to assure that the tool 50 is securely held between the jaws. The holes receiving the clamping screws are sufficiently large with respect to the diameter of the clamping screws 29 and 30 to accommodate for this clamping action so that the tool is maintained in operative position for the entire period of use.

Upon reference to FIG. 9 a masonry drill is mounted in the clamping jaws and holes have been made in cinder blocks 52 by the action of the reciprocation of the drill 50 which rebounds against the bottom of the hole 51 being formed in the cinder block or other masonry structure in a manner similar to the action of a bouncing ball thereby increasing the force of drilling. The actual contact of the end of the drill with the bottom of the hole 51 may be only a fraction of the number of reciprocations of the drill 50 or shaft 13 as the weight of the drill and adapter in relation to the weight of the motor have inertia effects which produce a different rate of actual drilling reciprocations of the end of the drill 50 in contact with the bottom of the hole so that the force of inpact of the drill on the buttom of the hole is many times greater than could be obtained by contact of the end of the drill with the bottom of the hole each time the reciprocation of the shaft 13 occurs. It appears that under these circumstances there is a harmonic relation that serves to produce more actual drilling impact than can be obtained with the impact every time the shaft reciprocates. It has also been found that holes can be drilled very close ogether without breaking out the material between the holes.

The invention can be used with strip material such as smoking pipe, pipe cleaners having fibers held between twisted wires for producing a reciprocating cleaning action on and structure including operating elements of machinery such as electrical contacts to permit cleaning with a minimum of labor letting the reciprocation of the motor do the work. Since the reciprocations can be adjusted from about one-half inch to zero this cleaning can be accomplished without requiring apperciable clearance.

From the above description it will be apparent that the present invention assures rapid and satisfactory work of many different types with power from the one motor. A file or portion of a file can be mounted within the jaws 25 and 26 in lieu of the sandpaper strips to more rapidly remove material such as servicing contacts where much material must be removed. This occurs where there are three contacts of a circuit breaker operating simultaneously from a single lever system and it is essential that the contacts engage simultaneously.

It will be apparent that the materials used will be of sufficient strength and toughness to withstand the stress and vibration and the jaws and body have been made of aluminum while the stub shaft and coupling have been made of brass. The threaded connection between the threads 16 and the threaded bore of stub shaft 20 will retain the stub shaft in fixed relation to the reciprocating shaft 13 of the motor. To assure that the vise will be in proper position the Allen head screw 24 is loosened after the stub shaft is screwed on shaft 13 until a squeaking sound is made and the vise is then positioned in the desired angular relation and Allen head screw 24 retightened retaining the parts in operative position. It will be noted that stub shaft 20 engages the bottom of the bore 23 and the shank of the tool engages the body 22 to assure positive pushing action on the tool.

The offset relation of clamping screws 29 and 30 provides for rocking of the movable jaw to engage irregular shanks of tools and still effectively retain the tool in operative position.

A particularly advantageous use of the present invention is for cleaning electical contacts regardless of whether such contacts carry small or large currents. A sandpaper strip 40 having a rough side 40A and a fine side 40B is mounted in the adapter with its free end positioned between two electrical contacts 41 and 42. The sandpaper strip 40 is guided with its rough surface 40A against the contact 42 and then the motor adapter and sandpaper strip is turned over and the contact 41 is sanded with the rough side 40A. Without changing the position of the motor the contact 42 is sanded with the fine side 40B. Thereafter the sandpaper strip 40 and the adapter and motor are turned over and the contact 41 is sanded with the fine surface 40B of the strip thus in three positions of the sandpaper strip adapter and motor, the contacts are sanded in coarse and fine condition.

Where more fine sanding is required a strip 43 of very fine sandpaper which may have abrasive material on only one surface is folded with the sanding surface outwardly and positioned over the end of the sandpaper strip 40 as shown in FIG. 7 and held in place on strip 40 by hand and such fine sandpaper is placed in contact with electrical contacts for final polishing and avoids the substitution of one sandpaper strip for another thereby simplifying and speeding the cleaning of electrical contacts.

The sandpaper strip 40 is guided by the position of the motor with one hand and by actual contact of the sandpaper strip with the other hand of which two fingers 44 and 45 of a person's hand 46 are shown in position guiding the strip 40 or folded over sandpaper 43.

A brush 60 is secured to a stiff metal strap shank 61 connected by a bend 62 to an attaching portion 63 secured to the brush by two or more screws or other fasteners 64. The shank 61 is adapted to be received between the clamping jaws 25 and 26 in the manner previously described. The brush makes it possible to clean many things such as upholstered furniture, rugs, carpets, clothing, etc. with any type of approved non-combustible cleaning fluid or other cleaning material. Since the strokes can be adjusted for maximum effectiveness it is possible to clean with a minimum of damage to the fabric.

A stiff brush works very well for cleaning pots and pans with or without an abrasive material.

The invention may be used for removing tile such as asphalt tile with a suitable tool and is adapted to be used with a conventional awl or punch, a cold chisel, razor blades, bars of emery material or any other tool which is reciprocated in normal use.

It will be apparent that various changes can be made within the scope of the invention as defined by the valid interpretation of the appended claims.

What is claimed is:

1. An adapter for holding a tool comprising a stub shaft having a threaded bore in one end thereof, a body having a bore in a portion thereof receiving the other end of said stub shaft, means to secure said body in angularly adjusted relation to said stub shaft, a first vise jaw fixed on said body and projecting outwardly from each side thereof and outwardly from the other end of said stub shaft and having its clamping jaw face adjacent a continuation of the axis of said stub shaft, a movable vise jaw having its clamping face adjacent said first vise jaw, said jaws having a pair of aligned bores positioned in diagonally opposite portions of said jaws on opposite sides of said stub shaft axis, a resilient layer on each clamping face of each jaw with said resilient layers having smaller openings in alignment with said pair of aligned bores, a clamping screw in each of said aligned bores being gripped by said resilient layers which yieldably retain said clamping screws in position, a concave-convex washer on each end of each screw with the concave side of the washer toward the adjacent jaw, a pair of star shaped lock washers having sharp engaging edges positioned between each concave-convex washer and the adjacent jaw, and shoulder means on one end of each screw engaging the adjacent concave-convex washer providing for effectively clamping a tool for operation by a machine having a threaded shaft for reception in the threaded bore of said stub shaft.

2. For use with a machine for producing reciprocation movements with said machine having means to adjust the length of movement, said machine including a threaded shaft, the combination of a stub shaft having a threaded end for mounting on said threaded shaft, a body having a bore in a portion thereof receiving the other end of said stub shaft, means to secure said body in angularly adjusted relation to said stub shaft, a first vise jaw fixed on said body and projecting outwardly from each side thereof and beyond the other end of said stub shaft and having its clamping jaw face adjacent a continuation of the axis of said stub shaft, a movable jaw having its clamping face adjacent said first vise jaw, said jaws having a pair of aligned bores positioned in diagonally opposite portions of said jaws on opposite sides of said stub shaft axis, a resilient layer on each clamping face of each jaw and with said resilient layers having openings of smaller transverse dimension than said bores in alignment with said pair of aligned bores, a clamping screw in each of said aligned bores and being gripped by said resilient layers retaining said clamping screws in position, a concave-convex washer on each end of each screw with the concave side of the washer toward the adjacent jaw, a pair of star-shaped lock washers having sharp engaging edges positioned between each concave-convex washer on each end of each screw and the adjacent jaw, and shoulder means on one end of each screw engaging the adjacent concave-convex washer, and a nut on the other end of each screw engaging the concave-convex washer on the other end of each screw whereby tools of regular or irregular shape may be supported by said jaws and be reciprocated by said machine.

3. An adapter for attachment to a reciprocating shaft for holding a tool, said adapter comprising a stub shaft having means at one end thereof for attachment to a reciprocating shaft, a body of substantial width and thickness mounted on said stub shaft, a first vise jaw permanently fixed on said body and projecting away from said attaching means and lying with its clamping face adjacent the axis of said stub shaft, said body providing a fixed abutment surface spaced from said attaching means, a movable jaw facing said first jaw, means comprising a pair of bolts passing through said movable jaw and the clamping face thereof at diagonally opposite positions of said jaws on opposite sides of said stub shaft axis to move said jaws into clamping relation to grip a tool of any configuration with a portion of the tool abutting the fixed abutment surface of said body assuring positive movement of the tool in the direction away from said attaching means.

4. An adapter for holding a tool in a reciprocation producing machine comprising a stub shaft having threads at one end thereof, a body having a bore in a portion thereof receiving the other end of said stub shaft, means to secure said body in angularly adjusted relation to said stub shaft, a first vise jaw fixed on said body and projecting from the other end of said stub shaft and having its clamping jaw face adjacent a continuation of the axis of said stub shaft, a movable vise jaw having its clamping face adjacent said first vise jaw, said jaws having a pair of aligned bores positioned in diagonally opposite portions of said jaws on opposite sides of said stub shaft axis, a clamping screw in each of said aligned bores, shoulder means on one end of each screw cooperating with the adjacent jaw, nut means on the other end of each screw for cooperation with the other jaw providing for effectively clamping a tool between said jaws for operation by a machine having cooperating threads for cooperation with the threaded end of said stub shaft.

5. A vise structure for gripping objects of substantially any shape comprising a first substantially rectangular jaw, means to support said first jaw, a second substantially rectangular jaw positioned in face to face relation to said first jaw, said jaws having a pair of aligned bores positioned in diagonally opposed positions in said jaws, a pair of screws of appreciably less transverse dimension than said bores in said bores, means to prevent rotation of said screws in said bores, said screws being provided with a shoulder on one end thereof and provided with a nut on the other end thereof with said shoulder and nut reacting against said jaws whereby the force of said screw will effectively force said jaws together in clamping relation.

6. The invention according to claim 5 in which the means to prevent rotation of the screws includes a resilient rubber-like material on the face of at least one jaw, which rubber-like material grips the screws yieldably preventing sliding and rotation of said screws without intentional manipulation of the screws by the user of the vise.

7. The invention according to claim 5 in which the first jaw has a body fixed thereto which provides an abutment surface transverse to both jaws and generally parallel to said screws to engage objects held in said vise.

8. An adapter for holding a tool comprising a stub shaft having means on one end for attachment to a machine, a body secured to the other end of said stub shaft, a first vise jaw fixed on said body and projecting from the other end of said stub shaft and having its clamping jaw face adjacent the continuation of the axis of said stub shaft, a movable vise jaw having its clamping face adjacent said first vise jaw, said jaws having a pair of aligned bores positioned in opposite portions of said jaws on opposite sides of said stub shaft axis, a resilient layer on the clamping face of each jaw with said resilient layer having openings of smaller transverse dimension than said bores in alignment with said bores, a loosely fitting clamping screw in each of said aligned bores being gripped by the said resilient layers which yieldably retain the screws in position, shoulder means on one end of each screw cooperating with the adjacent jaw, nut means on the other end of each screw for cooperation with the other jaw providing for effectively clamping a tool for operation by a machine having cooperating attaching means for cooperation with the attachment means on one end of said stub shaft.

References Cited by the Examiner

UNITED STATES PATENTS

| | | | |
|---|---|---|---|
| 475,410 | 5/92 | McKay | 310—17 |
| 1,276,804 | 8/18 | Painter | 310—17 |
| 1,978,681 | 10/34 | MacGregor | 51—328 |
| 1,984,500 | 12/34 | Tautz | 279—44 |
| 2,211,596 | 8/40 | Darash | 29—96 |
| 2,323,188 | 6/43 | Atkinson | 15—22.1 XR |
| 2,332,085 | 10/43 | Jones | 15—22 |
| 2,346,474 | 4/44 | De La Torre | 310—17 XR |
| 2,353,683 | 7/44 | Martines | 51—328 |
| 2,388,486 | 11/45 | Lederman | 15—22 XR |
| 2,472,040 | 5/49 | Brookfield | 279—112 XR |
| 2,489,582 | 11/49 | McCready | 15—22 |
| 2,497,578 | 5/50 | Bradley | 15—236 |
| 2,519,107 | 8/50 | Brown | 269—275 |
| 2,735,685 | 2/56 | Karr | 279—44 |
| 2,912,706 | 11/59 | Gerecke et al. | 12—22 |
| 2,940,324 | 6/60 | Belzner | 15—22 |
| 3,049,739 | 8/62 | Lantto | 15—93 |
| 3,074,090 | 1/63 | Thompson | 15—93 |

FOREIGN PATENTS 241,056  12/46  Switzerland.

CHARLES A. WILLMUTH, *Primary Examiner.*